United States Patent [19]
Iu

[11] Patent Number: 5,361,105
[45] Date of Patent: Nov. 1, 1994

[54] NOISE REDUCTION SYSTEM USING MULTI-FRAME MOTION ESTIMATION, OUTLIER REJECTION AND TRAJECTORY CORRECTION

[75] Inventor: Siu-Leong Iu, Bensalem, Pa.

[73] Assignee: Matsushita Electric Corporation of America, Secaucus, N.J.

[21] Appl. No.: 26,977

[22] Filed: Mar. 5, 1993

[51] Int. Cl.$^5$ .......................................... H04N 7/137
[52] U.S. Cl. .................. 348/699; 348/413; 348/416
[58] Field of Search ................ 358/105, 136; 348/413, 348/416, 699; H04N 7/137

[56] References Cited

U.S. PATENT DOCUMENTS

| | | | |
|---|---|---|---|
| 4,025,718 | 5/1977 | Paretti | 358/105 |
| 4,717,956 | 1/1988 | Moorhead et al. | 358/105 |
| 4,862,266 | 8/1989 | Gillard | 358/136 |
| 4,862,267 | 8/1989 | Gillard et al. | 358/136 |
| 4,864,393 | 9/1989 | Harradine et al. | 358/105 |
| 4,864,398 | 9/1989 | Avis et al. | 358/136 |
| 4,901,145 | 2/1990 | Harradine et al. | 358/136 |

OTHER PUBLICATIONS

E. Dubois and S. Sabri, "Noise reduction in image sequences using motion-compensated temporal filtering," *IEEE Transactions on Communications,* vol. COM-32, No. 7, pp. 826–831 (Jul., 1984).

T. J. Dennis, "Nonlinear temporal filter for television picture noise reduction," *IEEE Proc.,* vol. 127, Pt. G., No. 2, pp. 52–56 (Apr. 1980).

J. M. Boyce, "Noise reduction of image sequences using adaptive motion compensated frame average," *IEEE ICASSP-92,* pp. III 461–464.

J. S. Lim, *Two–Dimensional Signal and Image Processing,* Prentice Hall, 1990.

P. J. Rousseeuw and A. M. Leroy, *Robust Regression and Outlier Detection,* Wiley, 1987.

*Primary Examiner*—Tommy P. Chin
*Assistant Examiner*—Richard Lee
*Attorney, Agent, or Firm*—Ratner & Prestia

[57] ABSTRACT

In a video signal noise reduction system, image pixels are tracked across multiple frames and then averaged to produce respective noise reduced pixel values. A motion estimator identifies a motion block within several video frames and determines an approximate velocity vector using a trimmed square estimation procedure. Trajectory correction is applied to each pixel in the motion block based on the velocity vector in order to determine a revised trajectory for the pixels. This correction is accomplished by determining a difference in position of a motion block between successive video frames. Based upon this revised trajectory, appropriate pixels corresponding to the motion block are obtained. These pixels are used in conjunction with pixel values obtained from each of the processed frames to produce an averaged video frame. Each pixel of the averaged video frame replaces the corresponding pixel in the original frame if the difference between the original pixel and the corresponding averaged pixel is less than the median difference between all of the original and averaged pixels.

18 Claims, 16 Drawing Sheets

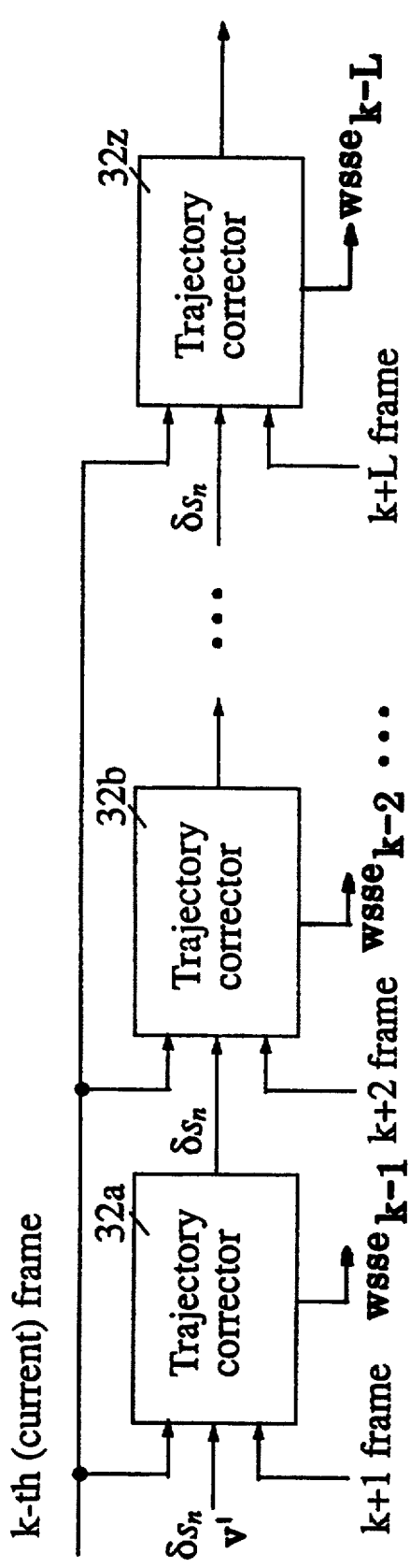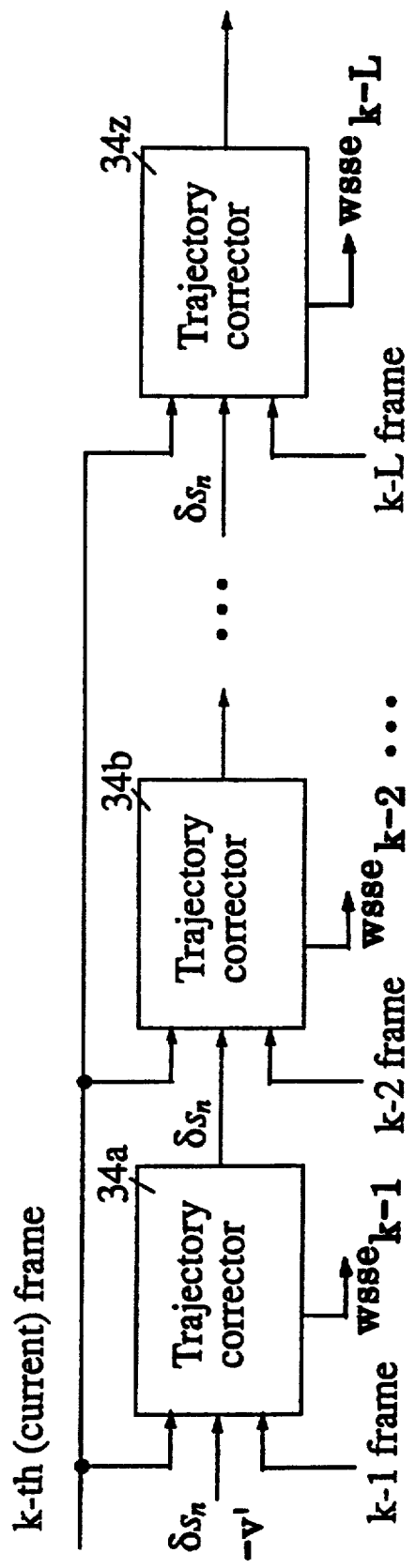
FIG.7a
FIG.7b

NOISE REDUCTION SYSTEM USING MULTI-FRAME MOTION ESTIMATION, OUTLIER REJECTION AND TRAJECTORY CORRECTION

FIELD OF THE INVENTION

The present invention relates to noise reduction in general and specifically to the reduction of noise in video signals. In particular, a method and apparatus are disclosed for reducing noise in a video signal by averaging video information over several frame intervals using multi-frame motion estimation with pixel based trajectory correction.

BACKGROUND OF THE INVENTION

Noise reduction (NR) in image sequences can improve both image quality and performance of subsequent video coding. This is so because noise in image sequences adds spurious uncorrelated image components which are visually offensive and which may reduce the effectiveness of any compression scheme which relies on image correlations from frame to frame.

As set forth in a book by J. S. Lim, entitled *Two Dimensional Signal and Image Processing*, Prentice Hall, 1990, pages 568 et seq., the simplest method for performing temporal filtering is through frame averaging. Frame averaging is very effective in processing a sequence of image frames which are contaminated by random noise but in which there is not much change in image information from frame to frame.

As is well known in the art, there are many different ways of performing frame averaging. Although frame averaging may be very simple and effective, precise signal registration from frame to frame is essential for success. In practical applications such as motion pictures and television, the image may change from frame to frame. Parts of the image may move by translation or rotation, by changing in size or by combinations of the above. In some prior-art systems, frame averaging was only applied to still areas of an image, that is to say, those areas which did not exhibit motion from frame to frame. Other prior-art systems attempted to estimate the movement of in image from one frame to the next and to compensate for this motion in applying frame averaging. In order to perform this motion-compensated image restoration, the image frames are averaged along approximate motion trajectories.

In an article by J. M. Boyce entitled "Noise Reduction of Image Sequences Using Adaptive Motion Compensated Frame Averaging", *IEEE ICASSP-92*, pages III-461 through III-464, a scheme is proposed to noise reduce image sequences by adaptively switching between simple (non-displaced) frame averaging and motion-compensated frame averaging on a block by block basis. In particular, a method is disclosed to adaptively switch between a displaced frame averaging method (i.e., motion-compensated frame averaging) and a non-displaced averaging (simple frame averaging) based on the relative differences between two blocks which differences are attributable to noise and to motion, respectively. The displaced frame averaging is applied to blocks which contain moving objects and displacement does not take place on blocks for which interframe differences are due only to noise.

An alternative way of accomplishing noise reduction is disclosed by an article by T. J. Dennis entitled, "Nonlinear Temporal Filter For Television Picture Noise Reduction", *IEEE Proceedings*, Vol 127, Pt. G, No. 2, April 1980, pages 52 et seq. Specifically, a conventional recursive interframe low pass filter for a 625 line 5.5 MHz monochrome television is modified so that any attenuation of frame differences is instantaneously dependent on their amplitude. Thus, the filter will attenuate large area spatial interference, such as streaking, provided it does not contain zero frequency or frame frequency components. Using this method, however, some spatial degradation may occur in areas of the image which contain motion.

A further technique to accomplish noise reduction is disclosed by an article by E. Dubois et al. entitled, "Noise Reduction in Image Sequences Using Motion-Compensated Temporal Filtering," *IEEE Transactions on Communications*, Vol. COM-32, No. 7, July 1984, pages 826 et seq. In particular, the nonlinear recursive filtering approach is extended by the application of motion-compensation techniques. Furthermore, a specific noise reducer for use with NTSC composite television signals is disclosed. Unlike prior low order non-recursive filters, the nonlinear recursive filtering approach described by Dubois is able to reduce noise to a greater extent than prior art noise reduction systems. However, there are still practical limitations on the ability of the circuit to effectively reduce various types of noise.

SUMMARY OF THE INVENTION

The present invention relates to a method and apparatus for estimating the magnitude and direction of interframe motion in a sequence of image frames. Using this method, a trajectory vector is first calculated for a block of pixels by matching the block in each of a plurality of preceding and succeeding frames and then using a robust estimator, such as a least-trimmed squares fitting procedure to obtain the trajectory vector.

According to another aspect of the invention, the motion vectors are used to reduce noise in the video signal. Using the estimated trajectory vector, a trajectory corrector generates a revised trajectory for individual pixels in the block from frame to frame across the plurality of video frames. An image averager then averages each of a plurality of pixels corresponding to the motion block along the revised trajectory. In this manner, an averaged video frame is produced.

According to yet another aspect of the invention, a breakdown detector inhibits replacement of a motion block with an averaged video frame by applying a mathematical function to each of the pixel values included in the averaged video frame to determine whether the noise reduction was effective. The averaged pixels values are discarded if the noise reduction is determined to be ineffective.

BRIEF DESCRIPTION OF THE DRAWINGS

FIG. 7a is a block diagram of a pixel-based trajectory correction system, for frames to be displayed after the current frame, which is suitable for use with the system shown in FIG. 2.

FIG. 7b is a block diagram of a pixel-based trajectory correction system, for frames to be displayed before the current frame, which is suitable for use with the system shown in FIG. 2.

DETAILED DESCRIPTION

Figure 1:
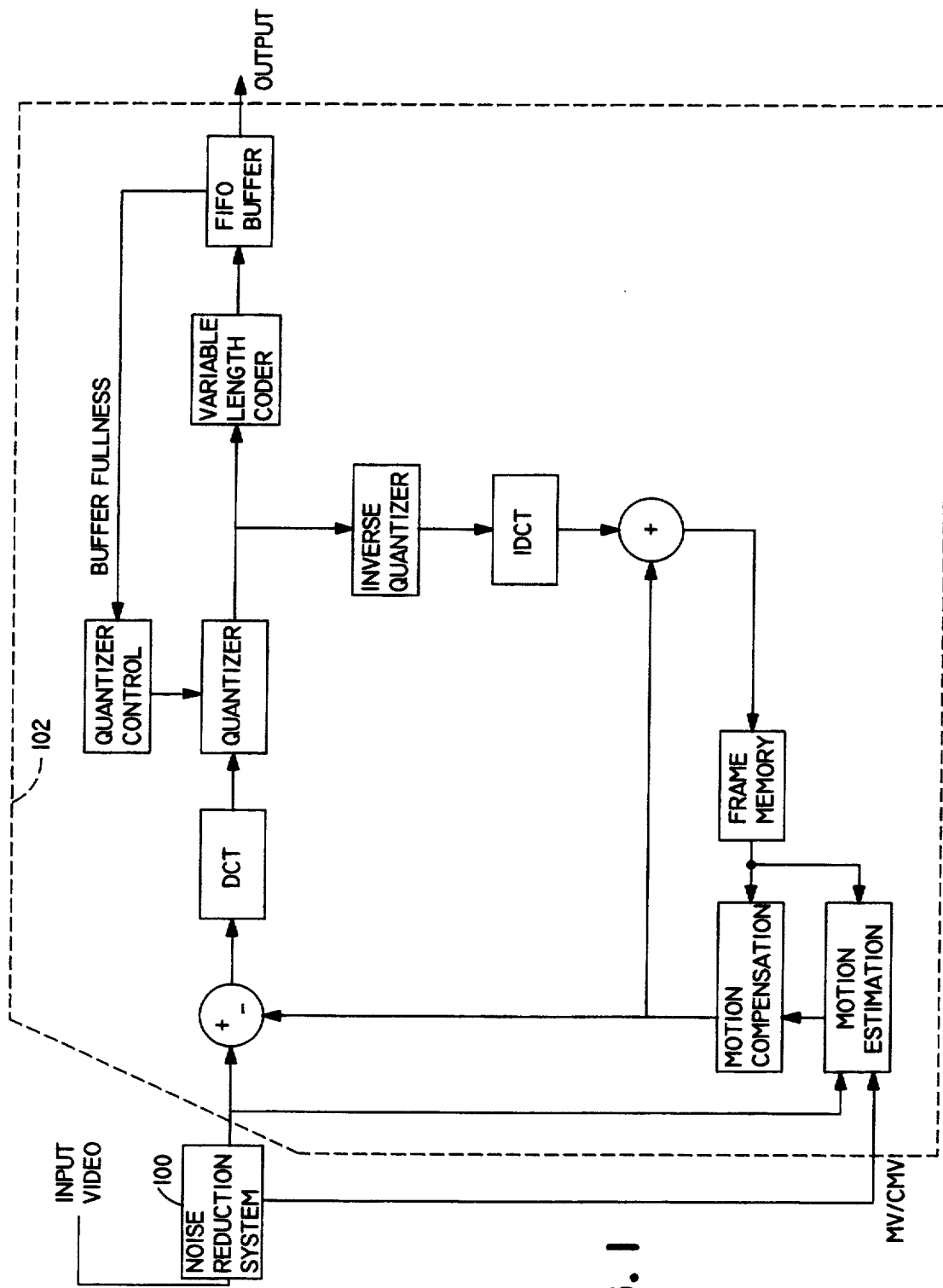
FIG. 1 is a block diagram which illustrates the operation of a video image compression system implemented according to the motion picture experts group (MPEG) compression method in conjunction with the present invention.

FIG. 1 illustrates a noise reduction system, in accordance with the present invention, which is used in conjunction with an MPEG video signal encoding system. In this configuration, the noise reduction system 100 receives and processes an input signal which is then transmitted to the MPEG encoding system 102. The MPEG encoding system 102 is of the type described, for example, in two papers by A. Puri et al. entitled, "On Comparing Motion-Interpolations Structures for Video Coding", Spie vol. 1360, *Visual Communications and Image Processing,* 1990, page 1560–1569 and "Video Coding With Motion-Compensated Interpolation for CD-ROM Applications", *Signal Processing: Image Communication II,* (1990) pages 127–144.

As described in these papers, the MPEG data compression system uses both intra-frame and inter-frame encoding techniques. The inter-frame encoding is motion compensated. That is to say, it follows block motion between frames to take advantage of temporal redundancy as it encodes successive image frames. In a conventional MPEG encoder, block motion is represented by motion vectors which are determined in the encoder.

The present invention also generates motion vectors, MV and CMV, as a part of its encoding operation. As described below, these motion vectors may be provided to the MPEG encoder to aid in encoding the noise-reduced image.

Figure 2:
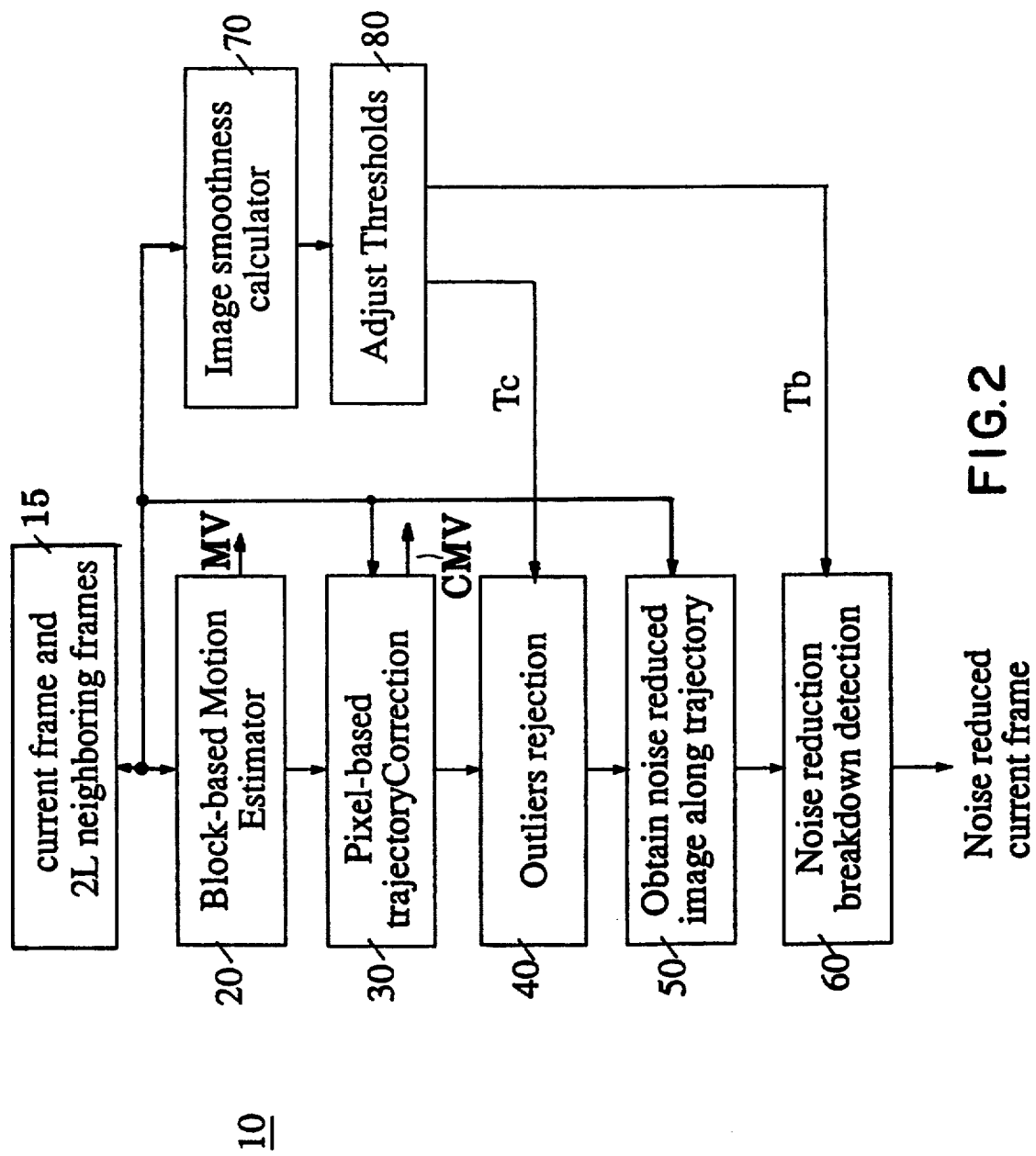
FIG. 2 is a functional block diagram of a noise reduction system in accordance with the present invention.
Figure 3:
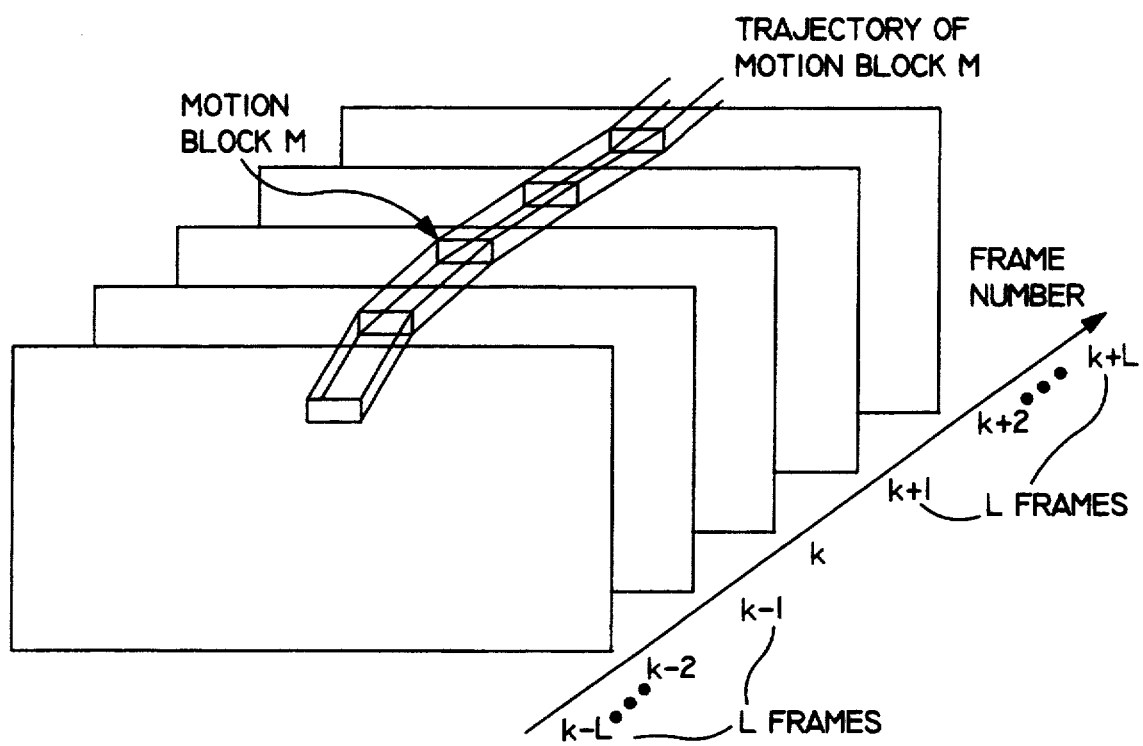
FIG. 3 is a diagram which illustrates the trajectory of a motion block along a plurality of frames.

An exemplary embodiment of the noise reduction system 100 is illustrated by a the block diagram shown in FIG. 2. The input signal to this noise reduction system is the current frame (k) and two sets of L neighboring frames, namely the L frames which are to be displayed before the current frame and L frames which are to be displayed after the current frame (i.e. $k-L$, $k-(L-1), \ldots, k-1, k, k+1, \ldots, k+(L-1), k+L$, for a total of $2L+1$ frames).

In the exemplary embodiment of the invention, the frames are stored in respective frame memories (shown collectively as a memory 15) and are applied to the block based motion estimator 20, the pixel-based trajectory correction circuitry 30, the circuitry 50 which obtains the noise reduced image along the corrected trajectory and the image smoothness calculator 70. Motion estimator 20 is provided with successive blocks of, for example, five-by-five pixels within the current frame (k) which are to be used as motion blocks. The processing steps described below are for one motion block. These steps are repeated for each motion block in frame k and then the frame position of each of the $2L+1$ frames advances such that frame k becomes frame $k+1$ and frame $k-1$ becomes frame k.

Although the identified motion block may appear in at least some of the frames which neighbor the current frame (k), the identified motion block may not always appear at the same coordinate position in each frame. Thus, motion estimator 20 determines a motion vector, MV, for the identified motion block. This motion vector indicates an estimated speed and trajectory of a motion block across a succession of video frames. The motion vector may be defined by a linear function, or any of a number of non-linear functions, of distance along the X, Y axes from frame to frame. In the exemplary embodiment of the invention, a linear motion vector is used. This type of motion vector gives a relatively good estimate for image components which move by translation and with a fixed velocity. As shown in FIG. 2, this motion vector may be provided by the motion estimator 20 to the MPEG encoder 102.

Each motion vector is then passed to pixel-based trajectory corrector 30. Trajectory corrector 30 determines a revised trajectory, CMV, from frame to frame for the pixels in the motion block. This revised trajectory is expressed as a plurality of displacements from the original motion vector. This plurality of corrected displacements is generated by performing a localized search about the position of the trajectory-corrected motion block between each pair of successive video frames. The pixel based correction produces motion estimates which are more accurate than the exemplary linear motion vector when objects exhibit non-linear motion, acceleration, or non-translational motion such as rotation. The corrected displacements, CMV, generated by the pixel-based trajectory corrector may be provided to the MPEG encoder for use in determining inter-frame motion vectors as shown in FIG. 1.

The corrected displacements are applied to an outlier rejector 40. Outlier rejector 40 computes a weighted sum of trimmed square value for each pixel in the motion block. A function of each weighted trimmed square value is compared to a threshold to determine if a noise reduced value for the pixel should be calculated and used in a noise reduced video frame. This system element compensates for frames in the image sequence in which the block may be temporarily masked. For example, where the image block represents a bird and, in the image sequence, a tree branch temporarily blocks the bird.

For each pixel which is identified as being suitable for use in a noise reduced video frame, a corresponding velocity vector is transmitted to noise reduced pixel calculator 50. Calculator 50 obtains a plurality of addresses corresponding to pixels in the motion block along the plurality of corrected displacements. The calculator then accesses the appropriate pixels from the appropriate frames to produce an averaged pixel value for the current frame.

The averaged pixel value is then received by noise reduction breakdown detector 60. Breakdown detector 60 inhibits replacement of pixels in the current frame (k) with the calculated noise-reduced pixel if the difference between the noise-reduced pixel value and the pixel value that it is to replace is greater, by a threshold factor, than the median-difference in the motion block. If this condition is detected, it is assumed to indicate that the trajectory estimation and correction improperly recognized correlated noise in the image and not valid image information.

As described above, two threshold values, Tc and Tb are used in the present invention. Tc is used to determine whether individual frames should be omitted from the calculation of corrected displacements by block 40 and the threshold value; Td is used to determine whether the noise reduced pixel value should replace the original pixel value. These threshold values are provided by circuitry 80 which continually adjusts the threshold values based on the output signal provided by an image smoothness calculator 70.

In the exemplary embodiment of the invention, the calculator 70 monitors blocks of pixels and adjusts the threshold values Tc and Td based on the spatial frequency content of the blocks of image pixels. This measurement is commonly referred to as AC energy. In the exemplary embodiment of the invention, the values of the thresholds Tc and Td are inversely proportional to the roughness of the image. For smooth images, that is to say those exhibiting relatively little variation from pixel to pixel, the values of Tc and Td are relatively large. For rough images, exhibiting more variation, the values of Tc and Td are relatively small.

Figure 4:
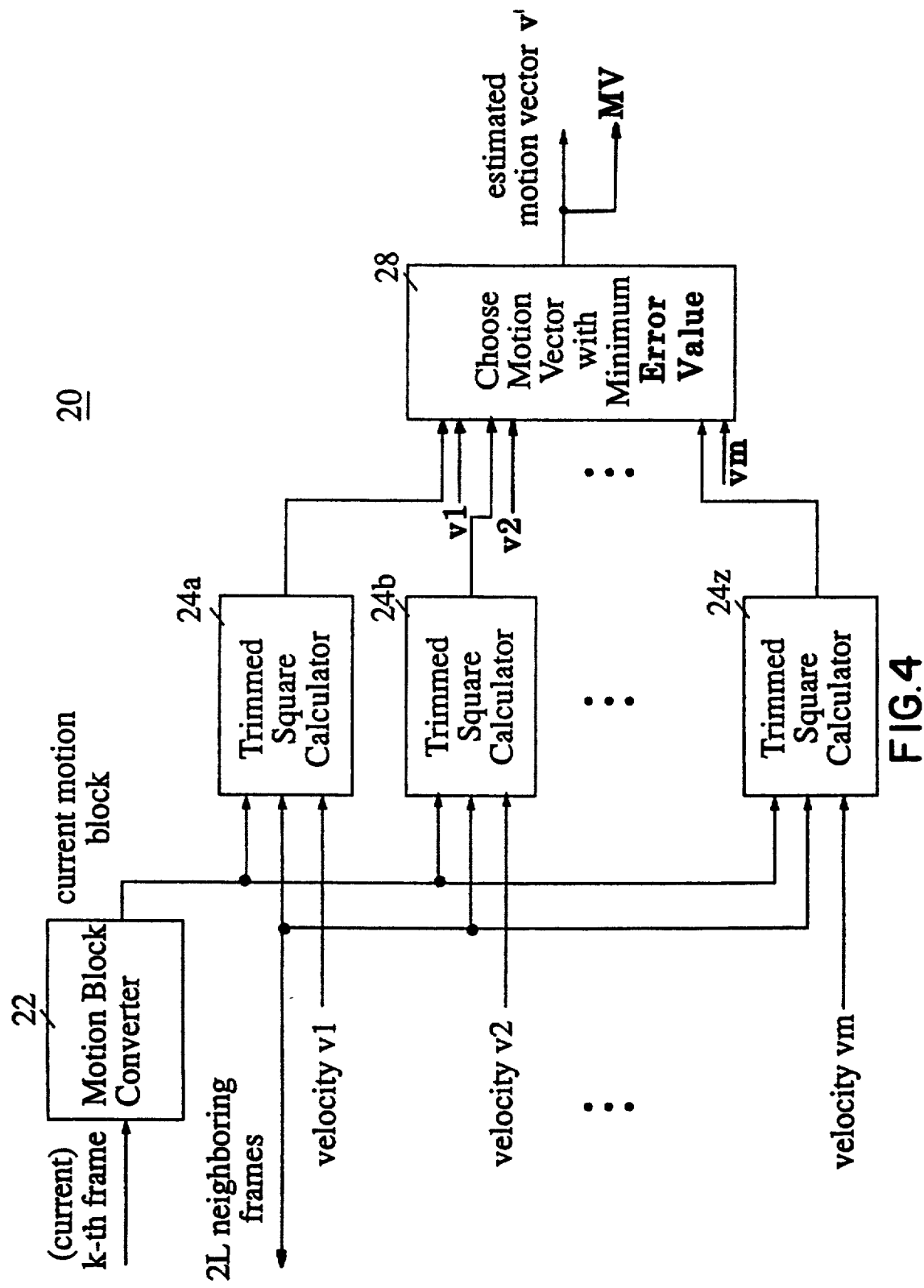
FIG. 4 is a block diagram of a block-based motion estimator suitable for use with the system shown in FIG. 1.

FIG. 4 is a block diagram of an exemplary block-based motion estimator 20. As shown in FIG. 4, a motion block converter 22 is coupled to extract the current motion block of pixels from the current frame k. Motion block converter 22 divides frame k into a plurality of distinct blocks, each of which is successively selected as the current motion block. The pixel values of the current motion block are then transmitted, along with the coordinate location of the current motion block in the current frame and a set of respectively different trial velocity vectors v1 through vm, to a plurality of blocks 24a through 24z which perform a robust estimation function. In the exemplary embodiment of the invention, these trimmed squared error calculators 24a through 24z. It is contemplated that any one of a number of robust estimators, such as median error calculators, could replace the trimmed square error calculators.

The block based motion estimator shown in FIG. 4 selects the one of these trial velocity vector which produces the smallest trimmed square error as the estimated trajectory vector.

The trial velocity vectors v1 through vm may be generated, for example, by a read-only memory (not shown) which provides a set of inter-frame displacements that map each pixel in the motion block into a set of corresponding pixel or inter-pixel positions in the frames along the velocity vector. In the exemplary embodiment of the invention, the set of pixel positions for all of the velocity vectors in all of the frames defines a roughly conical search region for the velocity vector that best conforms to the path of the motion block through the other frames.

Figure 5:
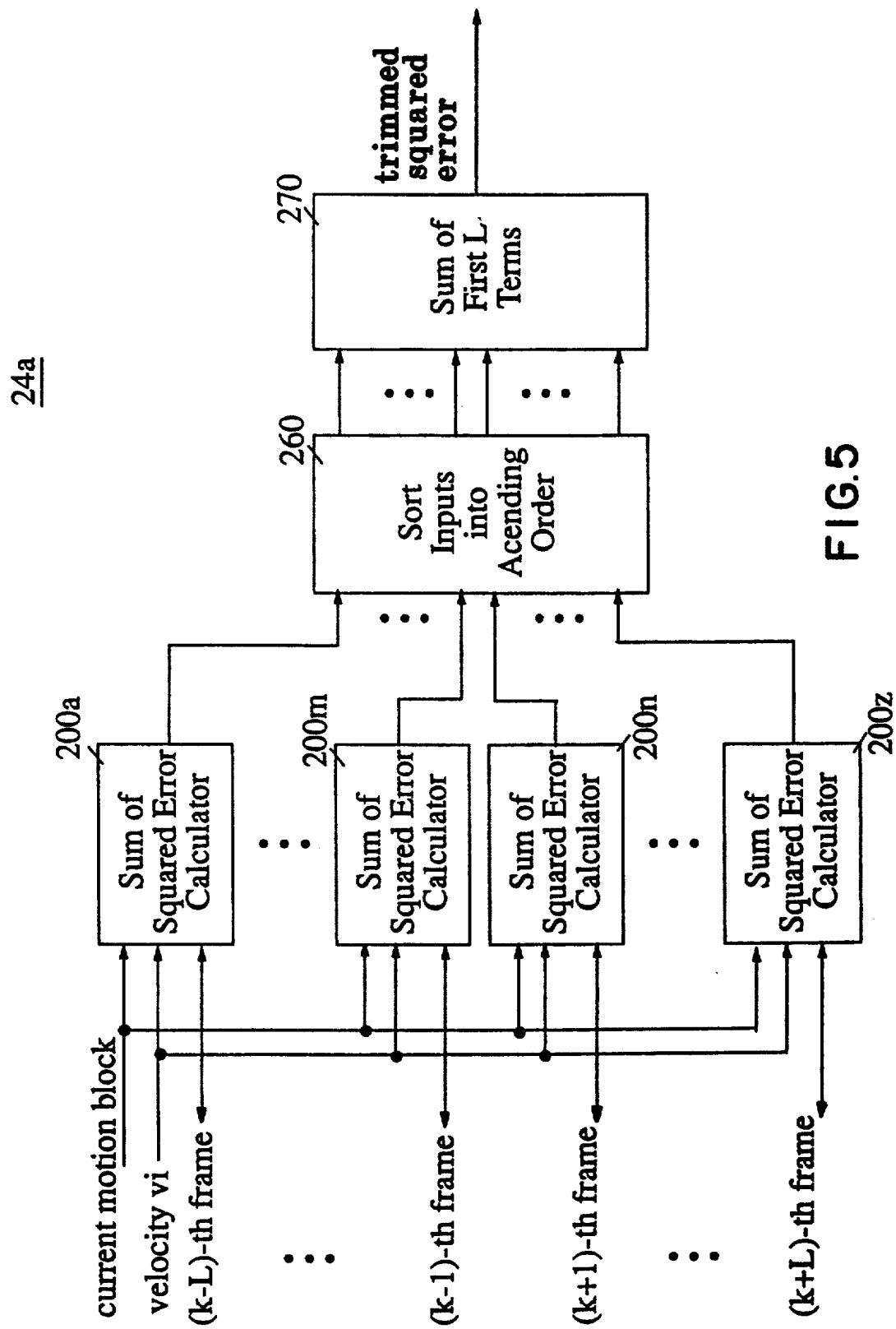
FIG. 5 is a block diagram of a trimmed square calculator suitable for use with the block-based motion estimator shown in FIG. 4.

An exemplary trimmed square error calculator suitable for use as one of the calculators 24a through 24z is shown in FIG. 5. As illustrated in FIG. 5, the trimmed squared error calculator includes a plurality of sum of squared error calculators 200a through 200z each of which receives the pixel values for the current motion block and the assigned trial velocity vector.

As described below, each of the calculators 200a through 200z is coupled to a respectively different one of the 2L frame memories (not shown) which hold the frames of video information to be used to produce the noise-reduced data for the current frame. As described below with reference to FIG. 6, each calculator provides address values to its respective frame memory and receives, from the frame memory, data values which are stored at the addressed locations. Each sum of squared error calculator 200 determines which pixels to get from its associated frame memory based upon how many pixel positions the target block is displaced from the current motion block along the velocity vector.

This pixel displacement is based on the received velocity vector and the distance between the current frame (k) and the target frame (l) associated with the particular sum of squared error calculator 200. In the exemplary embodiment of the invention, this pixel displacement is calculated by multiplying the velocity vector by a quantity equal to the difference between the frame numbers of the current and target frames.

The sum of squared error values for a block of pixel values in a frame l along the trajectory defined by the applied velocity vector can also be expressed in accordance with equation (1):

$$SSE_l = \sum_{(i,j) \in M} [I_k(p_{ij}(k)) - I_l(p_{ij}(l))]^2 \qquad (1)$$

where $I_l(p_{ij})$ is the intensity of the frame l at pixel position $P_{ij}$, M is the set of pixel positions in the motion block, $p_{ij}(l)$ is a pixel position in frame l taken along the velocity vector v, relative to the corresponding pixel value $p_{ij}(k)$ from the current frame k, according to the equation (2).

$$P_{ij}(l) = P_{ij}(k) + v^* (l-k) \qquad (2)$$

Each of the sum of square error calculators 200a through 200z calculates an SSE value for its associated frame memory based on the velocity vector v.

Figure 6:
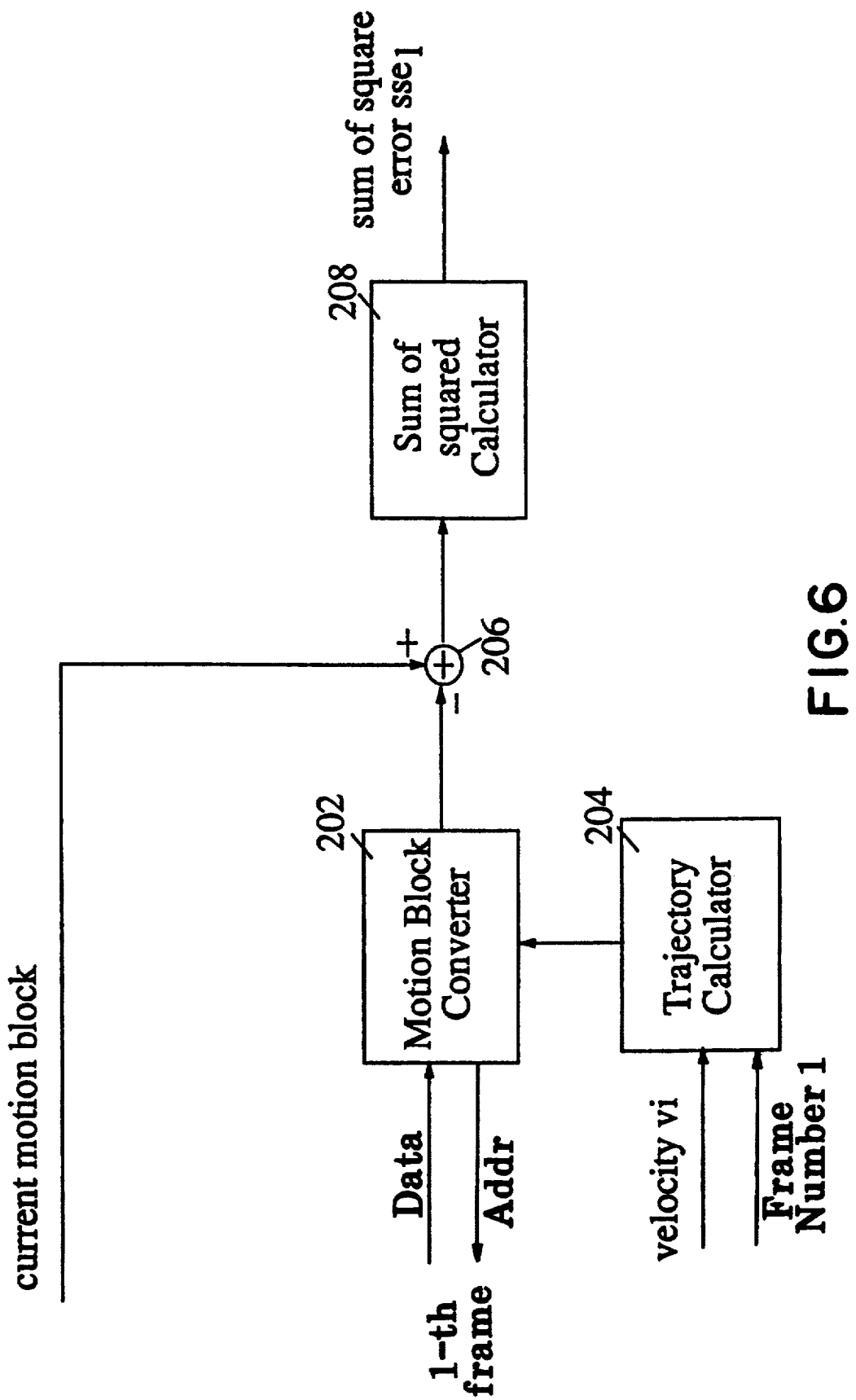
FIG. 6 is a block diagram of a sum of squared error calculator suitable for use with the trimmed square calculator shown in FIG. 5.

FIG. 6 is a block diagram of an exemplary circuit which implements equation (1) and, so, is suitable for use as one of the sum of square error calculators 200a through 200z, shown in FIG. 5. As shown in FIG. 6, the velocity v and frame number (l) of the target frame buffer are received by trajectory calculator 204. Trajectory calculator 204 determines a pixel displacement relative to the current motion block using equation (2). This displacement is applied to motion block converter 202 which uses it, and the location of the current motion block in the current frame (k), to determine the location of an appropriate block of pixels in the frame l along the velocity vector v.

Motion block converter 202 combines the pixel displacement with the current motion block number to obtain a final address. This address is used to fetch the target block of pixel data values from the frame buffer 1. The individual pixel values in this target block are subtracted from the corresponding pixel values in the current motion block using a subtracter 206. Thus, the output values produced by the subtracter 206 are a block of pixel differences or pixel error values. This block of difference values is applied to sum of squared calculator 208. Sum of squared calculator 208 produces the sum of square error value SSE by squaring each of the difference values in the block and then summing the results.

Referring to FIG. 5, the 2L+1 SSE values provided by the calculators 200a through 200z are sorted into ascending order, from smallest to largest, by a sorting unit 260. A summing circuit 270 then sums the L smallest values to generate the trimmed square error value for the velocity vector vn. Referring to FIG. 4, each of the trimmed squared error calculators 24a through 24z applies the calculated trimmed squared error value for its respective assigned velocity vector v1 through vm to a circuit 28 which selects the minimum trimmed squared error value to pass as the estimated motion vector v'. The vector v' may also be provided to the MPEG encoder 102 (shown in FIG. 1) as the motion vector MV.

Referring to FIG. 2, the estimated motion vector v' which is generated by block-based motion estimator 20 is received by pixel-based trajectory corrector 30. The trajectory corrector 30 is also coupled to the memory 15 which contains the current frame memory k and the 2L neighboring frame memories.

The operation of the pixel-based trajectory correction circuitry 30 is illustrated with reference to FIGS. 7a and 7b. As shown in these Figures, pixel-based trajectory corrector 30 includes a plurality of forward trajectory correctors 32a through 32z and a plurality of backward trajectory correctors 34a through 34z. All of the trajectory correctors 32a through 32z and 34a through 34z receive, as an input signal, an indication of the position of the current motion block in the current frame (k). Trajectory corrector 32a receives, at its input terminal $\delta s_n$, the estimated motion vector v' produced by block based motion estimator 20. Each trajectory corrector 32b-32z receives, from the previous trajectory corrector, a corrected motion vector at its $\delta s_n$ terminal. Furthermore, each trajectory corrector is coupled to a respective one of the frame buffers which hold image data that is to be displayed after the current frame (i.e. frame buffers k+1 through k+L).

The trajectory correctors 34a through 34z are similar to the trajectory correctors 32a through 32z. However, trajectory correctors 34a through 34z are coupled to the frame buffers which hold image data that is displayed prior in time to the current frame (i.e. frame buffers k−1 through k−L). In addition trajectory corrector 34a receives, at its input terminal $\delta s_n$, the negative of estimated motion vector v' produced by block based motion estimator 20.

As described below, each of the trajectory correctors 32a through 32z and 34a through 34z produces a weighted sum of squares error (WSSE) value which is used by the outlier rejection circuitry, as described below with reference to FIG. 13.

Figure 8:
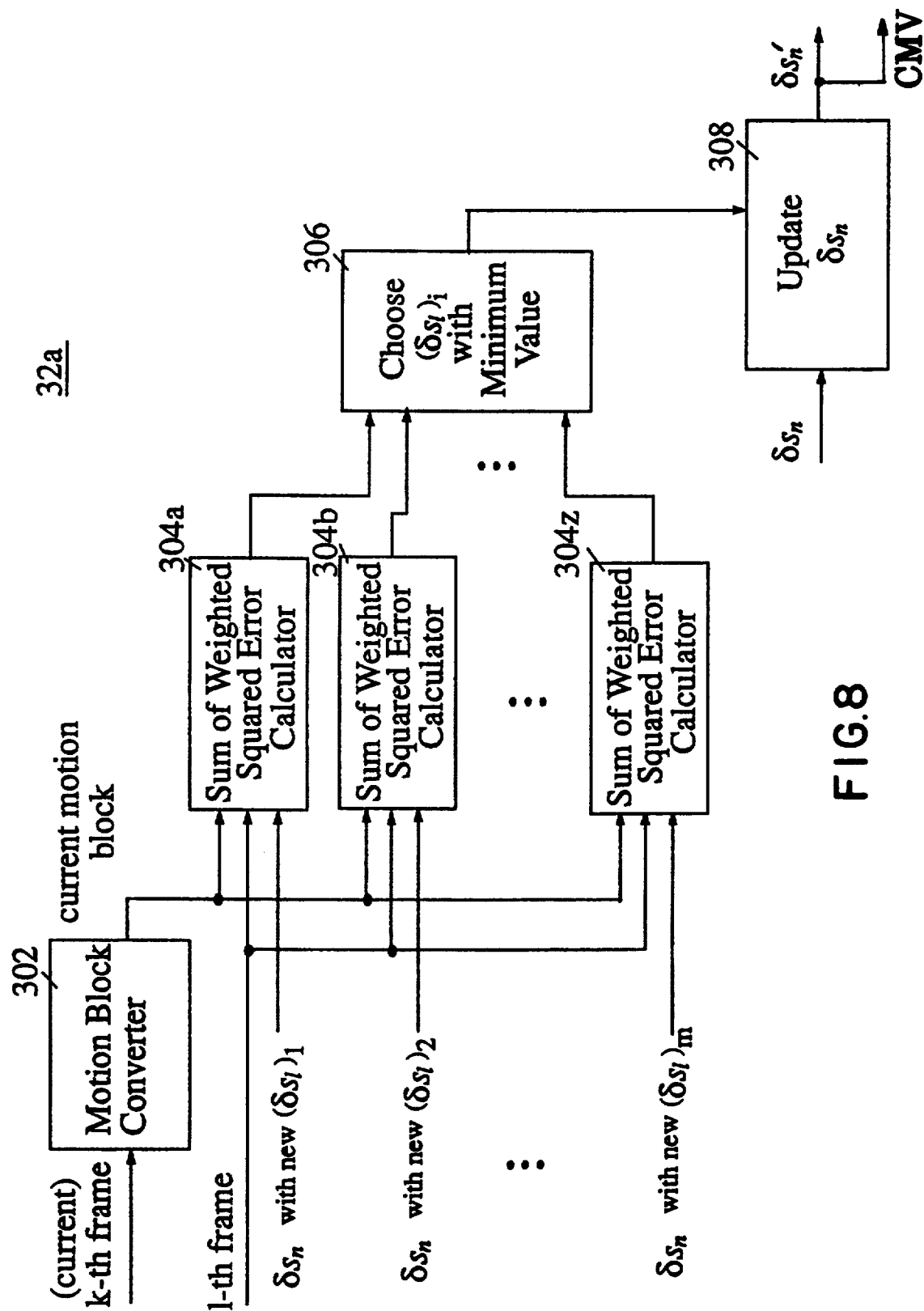
FIG. 8 is a block diagram of a trajectory corrector suitable for use with the pixel-based trajectory correction systems shown in FIGS. 7a and 7b.

A trajectory corrector suitable for use as one of the trajectory correctors 32 or 34 is shown in FIG. 8. In this Figure, a motion block converter 302 is coupled to the current frame buffer to extract a current block of pixels which will be used to determine the corrected trajectory.

Referring to FIGS. 8 and 2, the current block used by the trajectory correctors 32 may be different from the current block used by the motion block estimator 20. When these blocks are different, the process shown in FIG. 2 may be implemented as a pipeline process. When the motion block used by the trajectory correction circuitry 30 is different from that used by the motion estimation circuitry 20, the trajectory correction circuitry 30 also obtains the estimated motion vector for the current block from the current frame buffer.

The pixel values for the current motion block are provided by the motion block converter 302 to a plurality of sum of weighted squared error calculators 304a through 304z. In addition, each sum of weighted squared error calculator 304a through 304z receives a respective trial corrected motion vector. Each of these trial corrected motion vectors is formed by adding a respectively different displacement, $(\delta s_l)_i$ to the motion vector that was applied to the $\delta s_n$ input terminal of the trajectory corrector.

The different displacement values $\{(\delta s_l)_i | i=1 \text{ to } m\}$ may be provided, for example by a read only memory (not shown). In the exemplary embodiment of the invention, these displacement values define a search region in the next successive frame that is used to find the pixels, including interpolated pixels, which most closely match the corresponding pixels in the current frame as determined by the weighted squared error calculator.

Each sum of weighted squared error calculator 304a through 304z uses this information to extract a block of pixels from its associated frame memory as indicated by FIGS. 7a and 7b. Each of the calculators 304a through 304z then performs a sum of weighted squared error calculation on the two blocks of pixel data in accordance with equation 3:

$$WSSE\ (p_{i,j}(k)) = \sum_{(m,n) \in W} w_{m,n}[I_k(p_{i+m,j+n}(k)) - I_l(p_{i+m,j+n}(l))]^2 \quad (3)$$

where $P_{i,j}$ is a pixel address at coordinates x=i and y=j; W is a window of N by M pixel positions to be searched in the target frame, 1; n and m are the respective pixel positions in the N and M directions in the window; $w_{m,n}$ is a weighting factor to be applied at the window position m,n; $I(p_{i,j})$ is the intensity of the image at pixel position $P_{i,j}$ and k is the frame number of the current frame.

Figure 11:
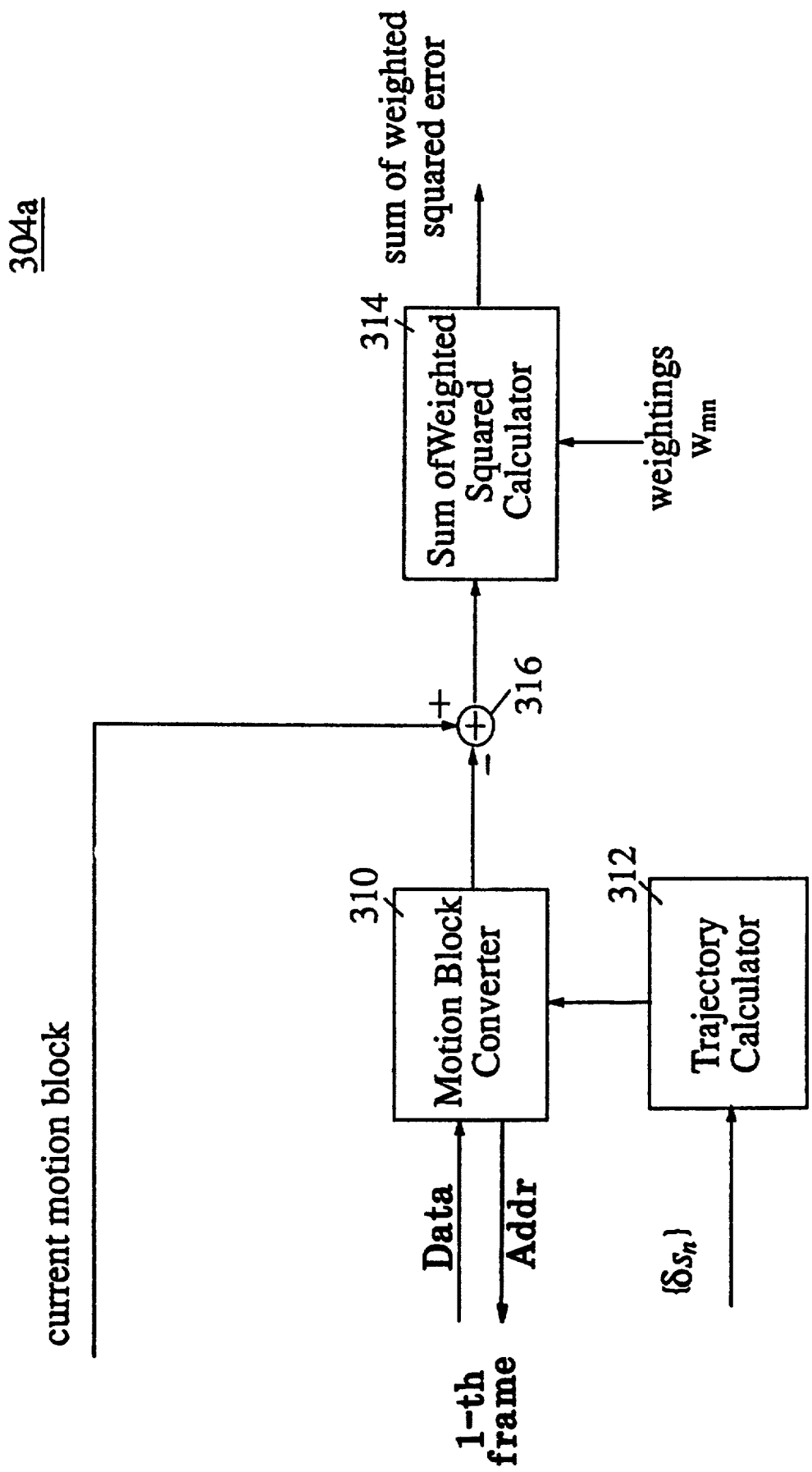
FIG. 11 is a block diagram of a sum of weighted squared error calculator which is suitable for use with the trajectory corrector shown in FIG. 8.
Figure 12:
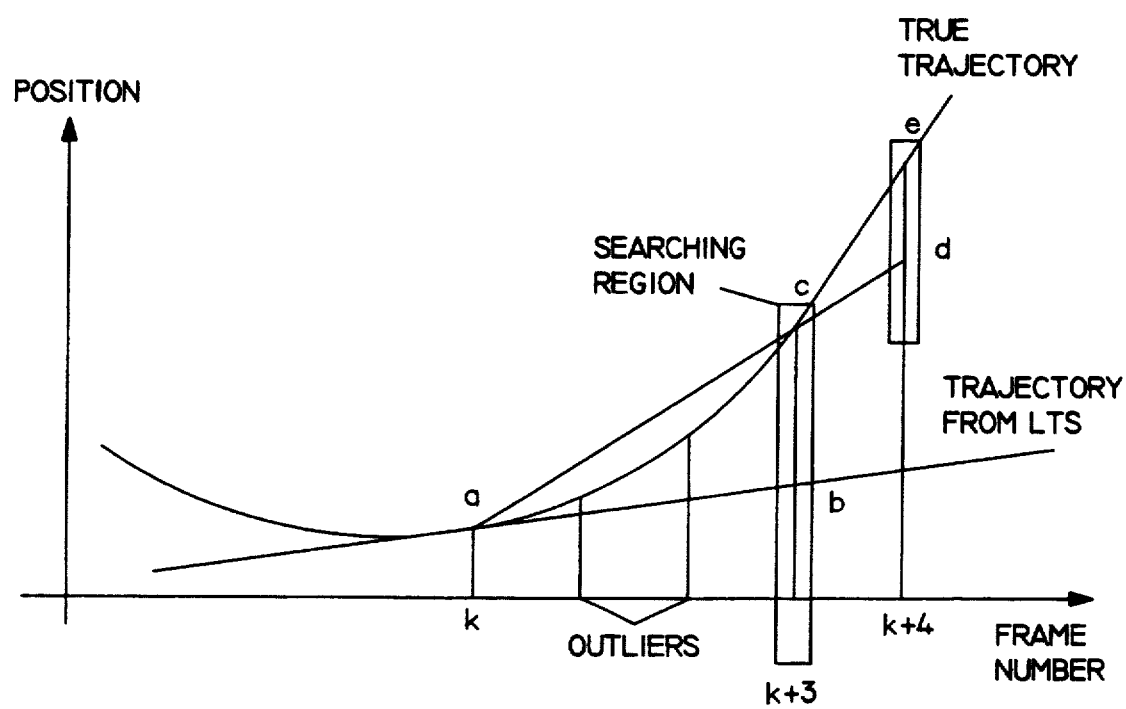
FIG. 12 is a graph of pixel position versus frame number which illustrates motion block trajectory correction with outlier rejection in accordance with an exemplary embodiment of the present invention.

FIG. 11 is a block diagram of an exemplary sum of weighted squared error calculator 304 which calculates the WSSE according to equation (3). As shown in FIG. 11, the current displacement vector, $\delta s_n$, is received by trajectory calculator 312. Trajectory calculator 312 uses this displacement vector to determine a corresponding pixel address in the frame buffer 1 (not shown) to which the sum of weighted squared error calculator 304 is coupled. This pixel address is provided, in turn, to the motion block converter 310. Motion block converter 310 accesses the frame buffer 1 with this address value to obtain a block of pixel data values. This block of pixel values represents a possible corrected trajectory for the motion vector that was applied to the input terminal of the trajectory corrector 32 or 34.

Figure 9:
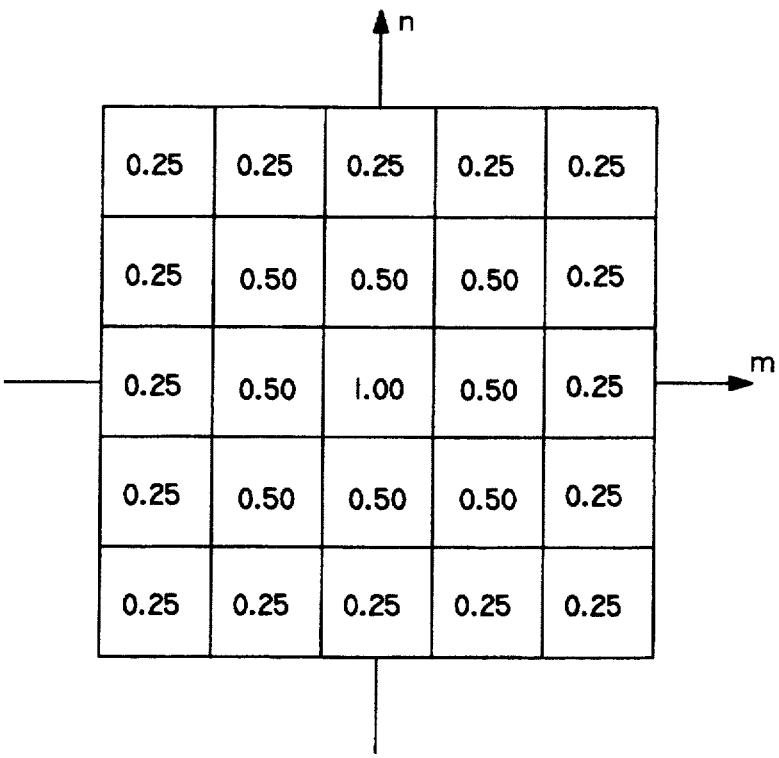
FIG. 9 is a diagram of a block of pixels which is useful for describing the operation of the pixel-based motion block trajectory correction system shown in FIGS. 7a and 7b.
Figure 10:
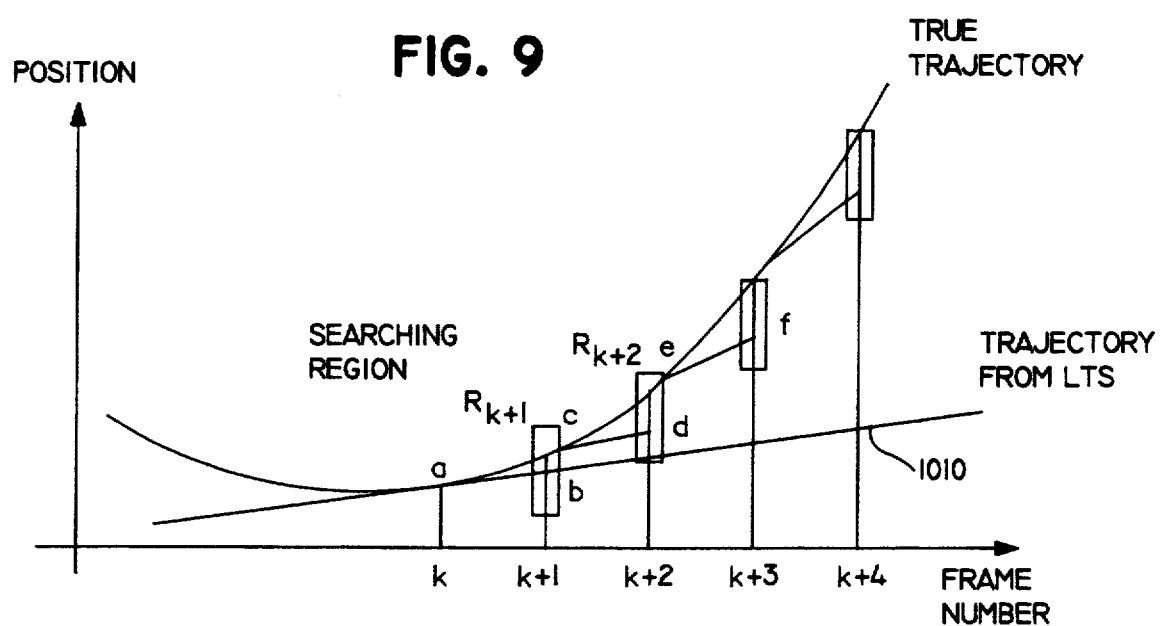
FIG. 10 is a graph of pixel position versus frame number which is useful for describing the operation of the pixel-based motion block trajectory correction system shown in FIGS. 7a and 7b.

The pixel values provided by the block converter 310 are subtracted from the pixel values of the current block by subtracter 316. The resulting block of pixel difference values is provided to a sum of weighted squared error calculator 314. The sum of weighted squared error calculator 314 is also coupled to receive weighting values which may, for example, be provided from a read only memory (ROM) (not shown). The weighting values apply different weights to pixels in the compared blocks based on the relative distance of the pixels from the center pixel in the block. An exemplary block of pixel weighting values is shown in FIG. 9.

Referring to FIG. 8, the sum of weighted squared error signals which are produced (as illustrated by FIG. 11) by all of the sum of weighted squared error calculators 304a through 304z are applied to a selection element 306. Element 306 determines which of the trial corrected trajectories has the smallest value. The output signal of the selection element 306 is a value indicating which of the trial corrected trajectories produced this minimum value.

This value is applied to element 308 which is also coupled to receive the uncorrected trajectory value, $\delta s_n$. Element 308 modifies the trajectory $\delta s_n$ to be a value $\delta s_n'$, the same corrected trajectory as was used to produced the minimum error value. This value is provided as the corrected trajectory to the trajectory corrector for the l+1th frame buffer. The corrected trajectory value $\delta s_n'$ may also be provided to the MPEG encoder 102 (shown in FIG. 1) as the corrected motion vector CMV. The signal CMV would be used by the encoder 102 to determine a motion vector to be used to encode a block centered about the pixel position for which the CMV signal was calculated.

As shown in FIG. 2, each of the corrected trajectories is transmitted from pixel-based trajectory correction circuit 30 to outlier rejection circuit 40. Exemplary outlier rejection circuitry 40 is shown in FIG. 13.

Figure 13:
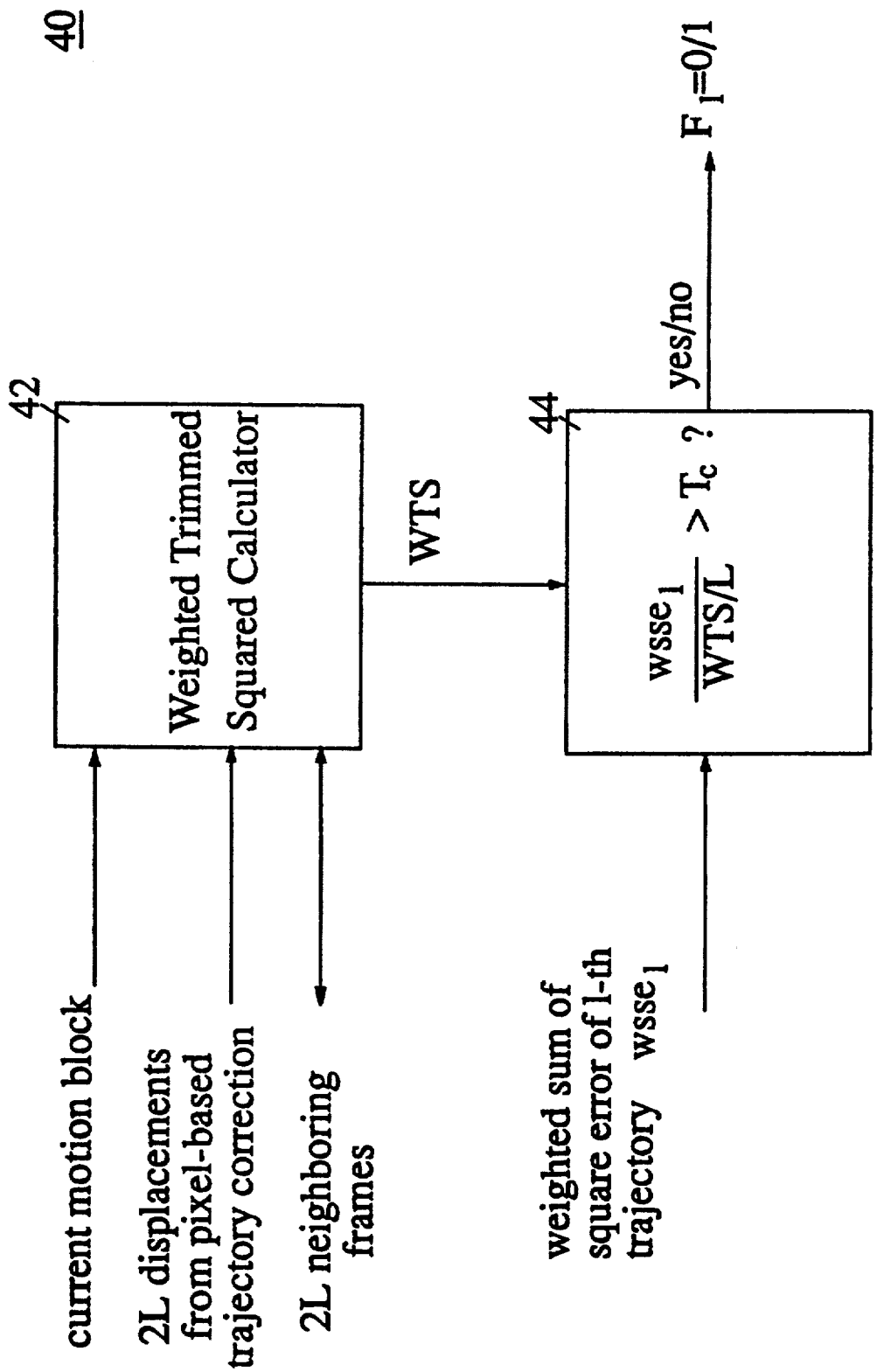
FIG. 13 is a block diagram which illustrates outlier rejection apparatus suitable for use in the system shown in FIG. 2.

AS shown in FIG. 13, the corrected trajectory which is generated by element 306 of pixel-based trajectory correction 30 is received by arithmetic element 44 of outlier rejector circuit 40. In addition, a weighted trimmed squared calculator 42 receives pixel values which define the current motion block, the 2L displacements ($\delta s_n'$) produced by the pixel-based trajectory correction circuitry 30, and the pixel values defined by these corrected trajectories for the 2L neighboring frames. This information is used by weighted trimmed squared calculator 42 to compute a weighted trimmed squared value, WTS, for the pixel according to equation (4).

$$WTS = \sum_{i=1}^{L} (WSSE)_{i:2L} \qquad (4)$$

where $(WSSE)_{1:2L} \leq (WSSE)_{2:2L} \leq \ldots \leq (WSSE)_{2L:2L}$. In this equation WSSE is the weighted sum of squares error calculated according to equation (3). This may be done by separate circuitry similar to that shown in FIG. 5 except that WSSE calculators replace the SSE calculators 200a through 200z. Alternatively, the WSSE values calculated by the individual trajectory correction circuits 32 and 34 may be applied to an alternative circuit (e.g. sorter 260 of FIG. 5) which orders the WSSE values according to their magnitude and then to a circuit (e.g. adder 270 of FIG. 5) which sums the L smallest values.

Referring to FIG. 13, he value WTS is then received by element 44. Element 44 compares the weighted trimmed squared received from element 42 and the corrected trajectory (the weighted sum of squared error of the l-th trajectory $WSSE_l$) to calculate a function value $F_l$ according to equation (5):

$$F_l = \begin{bmatrix} 0 & \text{IF } \dfrac{WSSE_l}{WTS/L} > T_c \\ 1 & \text{Otherwise} \end{bmatrix} \qquad (5)$$

In the above equation, $T_c$ is the rejection threshold for pixel trajectory correction. $F_l$ has a value of either 0 or 1 depending upon whether the function is greater than or less than the threshold value, $T_C$, respectively. As described in more detail below, if the ratio of the WSSE value, for the pixel in the l-th frame, to the average weighted trimmed square error for matching pixels in the other 2L frames value is greater than the threshold value $T_C$, the "matching" pixel from frame 1 is ignored when the noise-reduced pixel value is calculated.

As described above, element 50 of FIG. 2 uses the $F_1$ values generated by element 44 in order produce a noise reduced image. This is accomplished, for example, using a circuit such as that illustrated by the exemplary block diagram shown in FIG. 14.

For a given pixel in the current frame, if several pixel values from other frames, which pixel values are taken according to the corrected trajectory vectors, have been accepted after being processed by the outlier rejector 40 (i.e. $F_l=1$), then noise reduction is accomplished by averaging just these accepted pixel values along the trajectory as set forth in equation (6):

$$I_K(p_{ij}(k)) = \dfrac{1}{(|K_{ij}| + 1)} \left[ I_K(p_{ij}(k)) + \sum_{K_{ij}} I_K(p_{ij}(l)) \right] \qquad (6)$$

Where $K_{ij} \subseteq K$ is the set of accepted frames for pixel $P_{ij}(k)$ and $|K_{ij}|$ is the number of members of the set $K_{ij}$.

Figure 14:
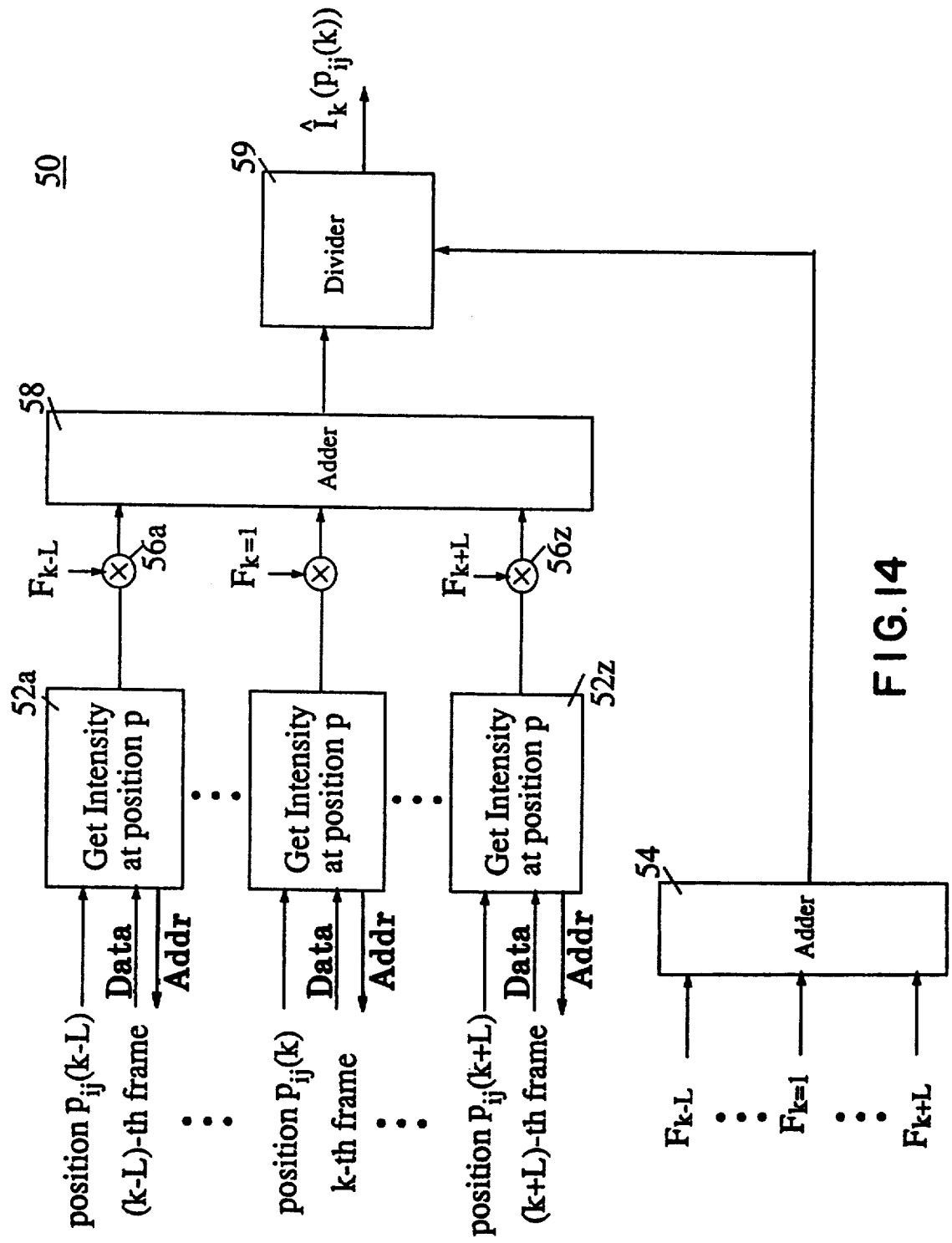
FIG. 14 is a block diagram of circuitry for obtaining noise reduced images along a trajectory which is suitable for use with the system shown in FIG. 2.

Specifically, as shown in FIG. 14, items 52a through 52z each provide a pixel value for a particular position $P_{ij}$ within a particular frame. Thus, each item 52a through 52z receives a particular frame number and a particular position within that frame. Depending on the results of outlier rejector 40 (i.e. whether a zero or a one is generated for the variable $F_l$), some of the intensities, $I(P_{ij})$, obtained by items 52a through 52z are added together by adder 58. Thus, if the outlier rejector determines that the threshold $T_c$ has not been exceeded, a unity value for $F_1$ is applied as the input to multipliers 56a through 56z. Conversely, if outlier rejector 40 determines that the threshold has been exceeded, then a zero value for $F_1$ is applied to the input of multipliers 56a through 56z. Thus, if a value of unity has been generated by element 44, the intensity of that pixel is received by adder 58. Adder 54 sums the $F_i$'s to produce a value equal to the total number of pixels along the corrected trajectory which were not identified as outliers. This value is used as the denominator input to divider 59. By also applying the output of adder 58 as the numerator input to divider 59, a final pixel value is obtained. This noise reduced pixel value is received by breakdown detector 60.

Figure 15:
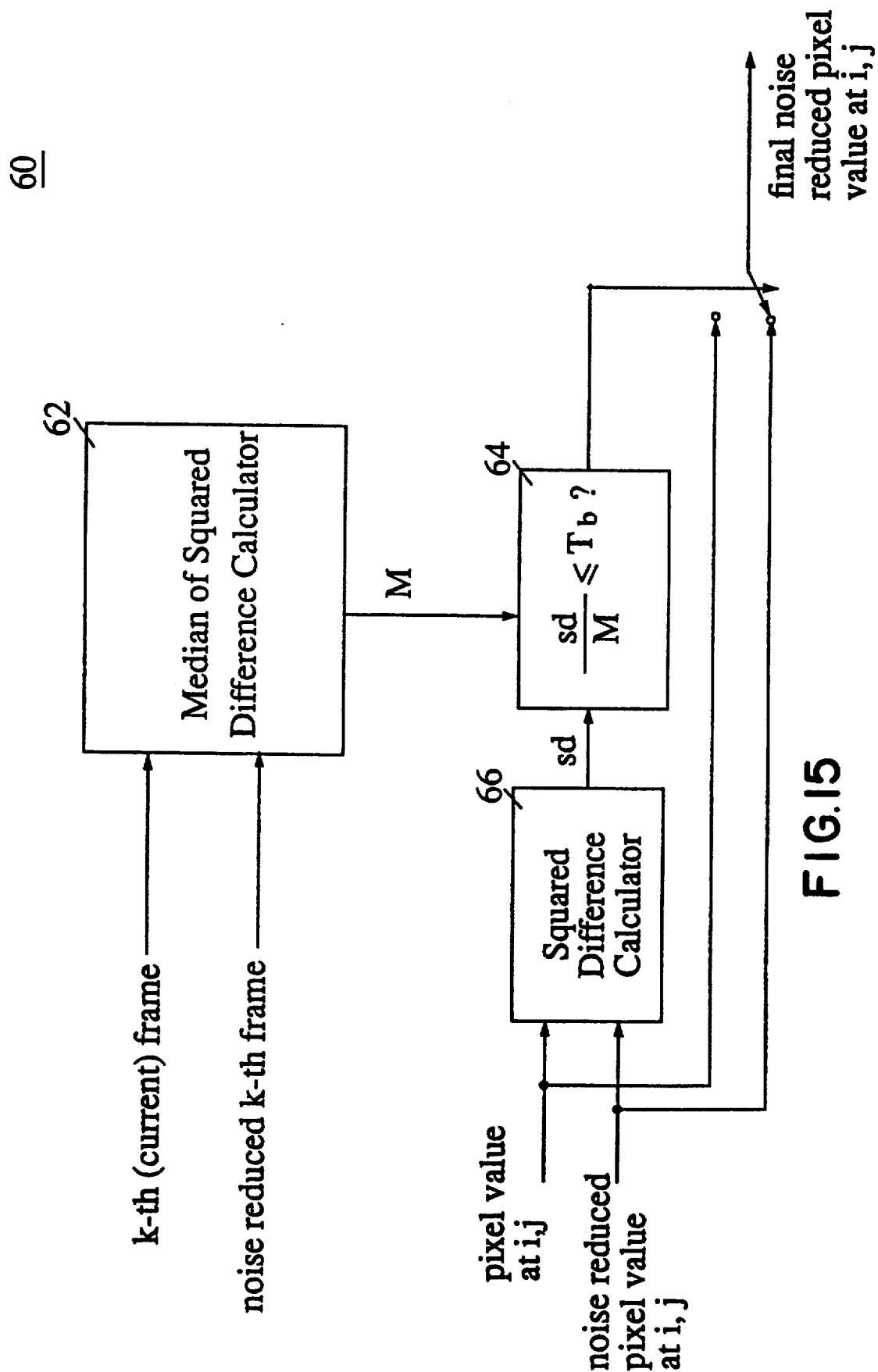
FIG. 15 is a block diagram of circuitry for performing breakdown detection which is suitable for use with the system shown in FIG. 2.

FIG. 15 is a block diagram of an exemplary breakdown detector 60. As shown by FIG. 15, the pixel values which are generated by element 50 and the pixel values from the original (not noise reduced) frame are received by squared difference calculator 66. An exemplary squared difference calculator is shown in FIG. 16.

Figure 16:
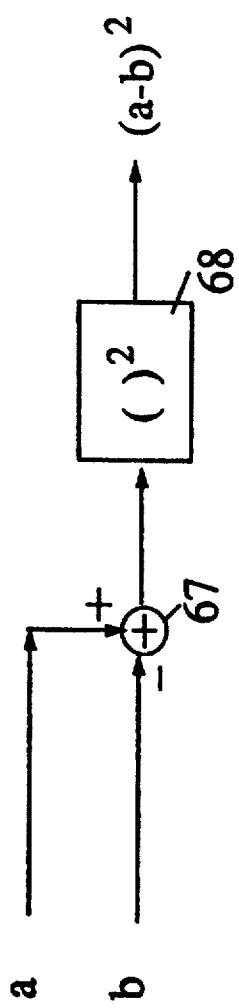
FIG. 16 is a block diagram of a squared difference calculator which is suitable for use in the breakdown detection circuitry shown in FIG. 15.

In FIG. 16, the difference between the original pixel value and the noise reduced pixel value is determined by an adder 67. The output of adder 67 is then squared by square function 68. Referring again to FIG. 15, the output value provided by square function 68, the value sd, is applied to arithmetic unit 64. Furthermore, as shown in FIG. 15, a value M, provided by a median of squared difference calculator 62, is also applied to the arithmetic unit 64.

Figure 17:
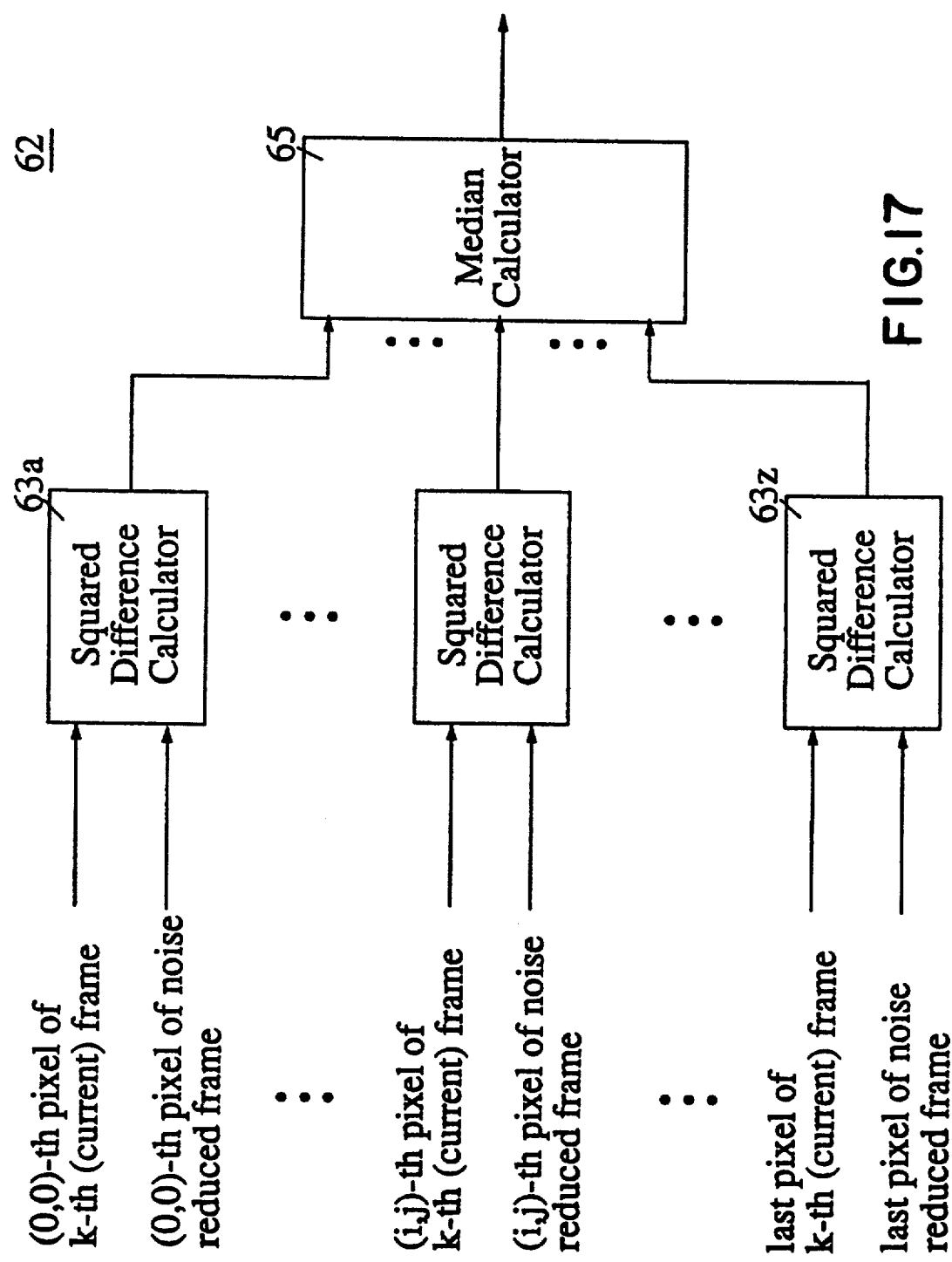
FIG. 17 is a block diagram which illustrates a median square difference calculator suitable for use in the breakdown detection circuitry shown in FIG. 15.

An exemplary circuit suitable for use as the median of squared difference calculator 62 is shown in FIG. 17. In FIG. 17, a set of squared difference calculators 63a through 63z each receive a respective pixel of the original frame along with the corresponding pixel from the noise reduced frame. These squared difference calculators 63a through 63z operate identically to the squared difference calculator 66 shown in FIG. 15. The output value produced by each of the squared difference calculators 63a through 63z is received by median calculator 65. Median calculator 65 determines the median M of all of the squared difference values provided by the squared difference calculators 63a through 63z. While this is shown as a parallel operation with all pixel positions in the image concurrently being compared, it is contemplated that the operation may be performed serially or with a reduced level of parallelism.

Next, as shown in FIG. 15, the output value, sd, of the squared difference calculator 66 is divided by the output value M provided by the median of square difference calculator 62. If the result of this division is less than or equal to a breakdown threshold value, $T_b$, then the noise reduced pixel value is used as the final pixel value. Otherwise, the original pixel value is used as the final pixel value. The breakdown detection set forth above can be summarized by inequality (7) as follows:

$$\frac{[I_k(p_{ij}(k)) - I_k'(p_{ij}(k))]^2}{\text{median}_{\{m,n\}\in N} \{[I_k(p_{mn}(k)) - I_k'(p_{mn}(k))]^2\}} \leq T_b \quad (7)$$

where $P_{ij}$ is the pixel position being tested in the current frame k and where N is the set of all pixels in frame k.

Following this inequality, for a given pixel position, if the difference between the original pixel and the noise reduced pixel is related to the median difference between all such pixels in the frame as the threshold value $T_b$ or less, then the processed pixel is a noise-reduced pixel. Otherwise, it an artifact caused, for example, by correlated noise in the image and should be ignored to keep from emphasizing the noise relative to the image.

By processing multiple frames of video information in the manner set forth above, noise may be substantially reduced even in images having large components in motion without sacrificing image resolution.

While the invention has been described in terms of an exemplary embodiment, it is contemplated that it may be practiced as outlined above with modifications within the spirit and scope of the appended claims.

The invention claimed is:

1. Apparatus for reducing noise in a video signal which includes a plurality of video frames, the apparatus comprising:
   motion estimator means for identifying a motion block in one video frame of said plurality of video frames and for determining an approximate motion vector for the motion block across the plurality of video frames, wherein the motion vector indicates an approximate trajectory of the motion block across the plurality of video frames;
   trajectory correction means for receiving the approximate motion vector from the motion estimator means and for determining a revised trajectory for the motion block across the plurality of video frames by determining a difference in position of respective components the motion block between each pair of the plurality of video frames; and
   image averaging means for obtaining a plurality of the components of the motion block along the revised trajectory and for calculating a single averaged component from the plurality of components.

2. Apparatus according to claim 1, further comprising breakdown detection means for replacing one of the components of the motion block with the averaged component if a ratio defined by a) an arithmetic difference between the one of the components and the averaged component and b) the median of the arithmetic differences between each component of the one video frame and its corresponding averaged component, is less than a threshold value.

3. Apparatus according to claim 2, further including:
   means for processing image pixel values in the one video frame to determine a spatial frequency spectrum for the one video frame;
   means for decreasing the threshold value in response to increasing levels of relatively high spatial frequency components in the spatial frequency spectrum of the video frame.

4. Apparatus according to claim 1, wherein the motion estimator means includes:
   means for generating a respective robust estimated error value for each of a plurality of trial velocity vectors; and
   means for selecting, as the approximate motion vector, one of said plurality of trial velocity vectors the estimated error value of which is less than the estimated error value of any other one of the plurality of trial velocity vectors.

5. Apparatus according to claim 4, wherein the trajectory correction means includes:
   means for modifying the approximate motion vector with a plurality of trial displacements to produce a respective plurality of modified motion vectors;
   means for generating a plurality of error values for one component of the motion block, the plurality of error values corresponding, respectively, to the plurality of trial displacements;

means for selecting, as the revised trajectory, one of the plurality of trial displacements which has the corresponding error value that is less than any other one of the plurality of error values.

6. Apparatus according to claim 5, wherein:

the motion block is a matrix of image pixel values, the one component is one of the image pixel values located at the center of the matrix and each trajectory defines a respective sequence of pixel values along the trajectory; and the means for generating a plurality of error values includes:

means for selecting a further matrix of pixel values from an other video frame from the plurality of frames which is different from the one video frame that includes the motion block, which said further matrix corresponds to the motion block projected to the other video frame along one of the plurality of modified motion vectors;

means for generating a matrix of difference values, each value representing a respective difference between one of the pixel values in the matrix and the corresponding pixel value in the further matrix, said matrix of difference values having one difference value which is designated as a center difference value;

means for assigning a first weighting factor to the center difference value and for assigning a second weighting factor, less than the first weighting factor, to the difference values in the matrix of difference values other than the center difference value; and means for summing the difference values as modified by their assigned weighting factors to produce an error value for the further matrix of pixel values; and the image averaging means includes means for calculating an average of the pixel values along the revised trajectory with the one of the pixel values to produce an average pixel value.

7. Apparatus according to claim 6, wherein the image averaging means includes outlier rejection means for rejecting, from the calculated average pixel value, ones of the pixel values along the revised trajectory which have error values that differ, by more than a predetermined threshold value, from an expected error between the pixel values along the revised trajectory.

8. Apparatus according to claim 7, further including:

means for processing image pixel values in the one video frame to determine a spatial frequency spectrum for the one video frame;

means for decreasing the predetermined threshold value in response to increasing levels of relatively high spatial frequency components in the spatial frequency spectrum of the one video frame.

9. Apparatus according to claim 8, wherein the image averaging means includes means for calculating the expected error value as the average of N selected error values corresponding to the pixels along the revised trajectory, where there are a total of M pixel values along the revised trajectory, M and N being integers and M being greater than N, and where each of the N error values is less than any of the error values which are not selected.

10. A method of reducing noise in a video signal which includes a plurality of video frames, the method comprising the steps of:

identifying a motion block, having a plurality of component parts, in one of said plurality of video frames;

determining an approximate motion vector for the motion block across the plurality of video frames, wherein the motion vector indicates an approximate trajectory of the motion block across the plurality of video frames;

determining a difference in position of respective components the motion block between each pair of the plurality of video frames to produce a revised trajectory for the motion block across the plurality of video frames; and averaging a plurality of the components of the motion block along the revised trajectory to produce a single averaged component from the plurality of components.

11. A method for determining a motion vector for a motion block of pixel values in one video frame selected from a plurality of successive video frames, the method comprising the steps of:

a) defining a plurality of trial velocity vectors;

b) selecting one velocity vector from the plurality of trial velocity vectors;

c) obtaining respective blocks of pixel values, corresponding to the motion block as indicated by the selected velocity vector;

d) generating a robust estimated error value representing an average error among a subset of the obtained blocks and the motion block including the steps of:

d1) comparing each of the obtained blocks of pixel values to the motion block to generate a respective measure of difference between the each of the obtained blocks of pixel values and the motion block;

d2) determining a threshold measure of difference from all of the measures of difference;

d3) defining a proper subset of the obtained blocks of pixel values, by excluding ones of the obtained blocks of pixel values having respective measures of difference which are greater than the threshold measure of difference;

d4) calculating the robust estimated error value using only those obtained blocks of pixel values in the defined proper subset; and d5) associating the robust estimated error value with the selected velocity vector;

e) repeating steps b) through d) until a robust estimated error value has been associated with each of the plurality of trail velocity vectors;

f) selecting, as the motion vector, one of the plurality of trail velocity vectors which has the associated robust estimated error value that is less than the robust estimated error value associated with any other one of the plurality of trail velocity vectors.

12. A method according to claim 11 further comprising the step of associating the motion vector with the motion block of pixel values in a manner that allows the motion vector to be used during motion compensated predictive encoding of the motion block of pixel values.

13. A method according to claim 12 further including the steps of:

selecting one pixel value from the motion block of pixel values;

generating a corrected trajectory for the selected pixel value and a corresponding pixel value in a selected one of the plurality of successive video frames which is immediately adjacent in time to the one video frame, including the steps of:

generating a plurality of modified motion vectors;

selecting a further block of pixel values from the selected video frame which further motion block corresponds to the motion block as determined by one of the plurality of modified motion vectors;

calculating a block of difference values, each value representing a respective difference between one of the pixel values in the motion block and the corresponding pixel value in the further block wherein the block of difference values includes a center difference value;

assigning a first weighting factor to the center difference value and assigning a second weighting value, less than the first weighting value, to the ones of the difference values, other than the center difference value, in the block of difference values;

summing the difference values, as modified by their assigned weighting factors, to produce an error value for the one of the plurality of modified motion vectors; and selecting the modified motion vector having the error value which is less than any other error value as the corrected trajectory.

14. A method according to claim 13 further including the step of associating the corrected trajectory with the motion block of pixel values in a manner that allows the corrected trajectory to be used during motion compensated predictive encoding of the motion block of pixel values.

15. Apparatus which determines a motion vector for a motion block of pixel values in one video frame selected from a plurality of successive video frames, the apparatus comprising:

a memory for holding the plurality of successive video frames;

means for defining a plurality of trial velocity vectors;

means for obtaining respective blocks of pixel values from the memory, said blocks of pixel values corresponding to the motion block as indicated by a respective one of the trial velocity vectors;

means for generating a plurality of trimmed square error values representing respective average errors among a subset of the obtained blocks and the motion block for the respective plurality of trial velocity vectors, said means for generating comprising:

means for comparing each of the obtained blocks of pixel values to the motion block to generate respective simple error values indicating differences between each of the obtained blocks of pixel values and the motion block;

means for determining a threshold error value from all of the simple error values;

means for defining a proper subset of the obtained blocks of pixels, by excluding ones of the obtained blocks of pixel valves having respective simple error values which are greater in magnitude than the threshold error value;

calculating the trimmed square error value by summing the squares of the simple error values corresponding to only those obtained blocks of pixels in the proper subset; and means for associating each trimmed square error value with its respective one of said trial velocity vectors, means for selecting, as the motion vector, one of the plurality of trial velocity vectors which has an associated trimmed square error value that is less than the trimmed square error value associated with any other one of the plurality of trial velocity vectors.

16. A method of generating a corrected trajectory for a motion block of pixel values taken from a selected image frame of a plurality of sequential image frames, wherein the motion block has an associated motion vector, the method including the steps of:

defining a plurality of correction vectors relative to the motion vector by selecting blocks of pixel values from one frame in the plurality of sequential image frames which is next to the selected image frame, said selected blocks having displacements from the motion block in the selected image frame which are less than a predetermined maximum value;

selecting one pixel value from the motion block of pixel values;

calculating a plurality of error values representing respective differences between the selected blocks of pixel values and the motion block of values; and selecting one of the plurality of correction vectors, which corresponds to one of the plurality of error values that is smaller than any other one of the error values, as the corrected trajectory for the motion block.

17. A method according to claim 16, wherein the step of calculating a plurality of error values includes the steps of:

a) selecting one of said plurality of correction vectors;

b) locating one block of pixel values of the selected blocks of pixel values in one of the sequential image frames which is next to the selected image frame and which said one located block of pixel values corresponds to the motion block of pixels along the selected correction vector;

c) calculating a block of difference values, each of said difference values representing a respective difference between one of the pixel values in the motion block and a pixel value at a corresponding location in the one located block of pixel values, wherein the block of difference values includes a center difference value;

d) assigning a first weighting factor to the center difference value and assigning a second weighting value, less than the first weighting value, to ones of the difference values other than the center difference value in the difference block;

e) summing the difference values, as modified by their assigned weighting factors, to produce an error value for the selected correction vector; and f) repeating steps a) through e) for each of said plurality of correction vectors.

18. Apparatus which generates a corrected trajectory for a motion block of pixel values taken from a selected image frame of a plurality of sequential image frames, wherein the motion block has an associated motion vector, the apparatus comprising:

a memory for holding the plurality of sequential image frames;

means for defining a plurality of correction vectors relative to the motion vector by selecting blocks of pixel values from one frame in the plurality of sequential image frames which is next to the selected image frame, said selected blocks having displacements from the motion block in the selected image frame which are less than a predetermined maximum value;

means for selecting one pixel value from the motion block of pixel values means for calculating a plurality of error values representing respective differences between the selected blocks of pixel values and the motion block of pixel values; and means for selecting one correction the plurality of correction vectors, which said one correction vector corresponds to one of the plurality of error values that is smaller than any other one of the plurality of error values, as the corrected trajectory for the motion block.

* * * * *

UNITED STATES PATENT AND TRADEMARK OFFICE
CERTIFICATE OF CORRECTION

PATENT NO. : 5,361,105
DATED : November 1, 1994
INVENTOR(S) : Iu

It is certified that error appears in the above-indentified patent and that said Letters Patent is hereby corrected as shown below:

Column 14, line 54, the word "trail" should be --trial--.

Column 14, line 56, the word "trail" should be --trial--.

Column 14, line 59, the word "trail" should be --trial--.

Column 16, line 29, after the word "of" insert --pixel--.

Column 18, line 7, after the word "correction" insert --vector from--.

Signed and Sealed this

Fourteenth Day of March, 1995

Attest:

BRUCE LEHMAN

*Attesting Officer*    *Commissioner of Patents and Trademarks*